(12) United States Patent
Conkie et al.

(10) Patent No.: US 9,117,445 B2
(45) Date of Patent: **\*Aug. 25, 2015**

(54) SYSTEM AND METHOD FOR AUDIBLY PRESENTING SELECTED TEXT

(71) Applicant: INTERACTIONS LLC, Franklin, MA (US)

(72) Inventors: Alistair D. Conkie, Morristown, NJ (US); Horst Schroeter, New Providence, NJ (US)

(73) Assignee: Interactions LLC, Franklin, MA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/943,242

(22) Filed: Jul. 16, 2013

(65) Prior Publication Data

US 2013/0304474 A1    Nov. 14, 2013

Related U.S. Application Data

(63) Continuation of application No. 13/567,550, filed on Aug. 6, 2012, now Pat. No. 8,489,400, which is a continuation of application No. 12/257,994, filed on Oct. 24, 2008, now Pat. No. 8,239,201.

(60) Provisional application No. 61/096,787, filed on Sep. 13, 2008.

(51) Int. Cl.
| | | |
|---|---|---|
| *G10L 13/08* | (2013.01) | |
| *G06F 3/0482* | (2013.01) | |
| *G06F 3/0488* | (2013.01) | |
| *G06F 3/16* | (2006.01) | |
| *G10L 15/22* | (2006.01) | |

(52) U.S. Cl.
CPC ............. *G10L 13/08* (2013.01); *G06F 3/0482* (2013.01); *G06F 3/0488* (2013.01); *G06F 3/167* (2013.01); *G10L 15/22* (2013.01); *H04M 2250/22* (2013.01)

(58) Field of Classification Search
CPC ....... G10L 13/08; G10L 15/22; G06F 3/0482; G06F 2/0488; G06F 3/167; G06F 15/0283; G06F 15/0291; G06F 17/30033; H04M 2250/22
USPC ...................... 704/260, 270, 275, 270.1, 258; 345/173, 168, 179, 184; 379/88.14, 379/88.04, 88.11, 88.13, 88.22; 455/414.4, 455/566, 413; 709/202; 707/999.003, 707/999.004, 201; 717/777; 715/863
See application file for complete search history.

(56) References Cited

U.S. PATENT DOCUMENTS

| | | | |
|---|---|---|---|
| 5,511,148 A | 4/1996 | Wellner | |
| 5,715,370 A | 2/1998 | Luther et al. | |
| 6,107,997 A | 8/2000 | Ure | |
| 6,178,402 B1 | 1/2001 | Corrigan | |
| 6,181,344 B1 \* | 1/2001 | Tarpenning et al. | 715/863 |
| 6,331,867 B1 \* | 12/2001 | Eberhard et al. | 715/864 |
| 6,356,287 B1 \* | 3/2002 | Ruberry et al. | 715/864 |
| 6,624,803 B1 \* | 9/2003 | Vanderheiden et al. | 345/156 |

(Continued)

*Primary Examiner* — Vijay B Chawan
(74) *Attorney, Agent, or Firm* — Fenwick & West LLP

(57) ABSTRACT

Disclosed herein are methods for presenting speech from a selected text that is on a computing device. This method includes presenting text on a touch-sensitive display and having that text size within a threshold level so that the computing device can accurately determine the intent of the user when the user touches the touch screen. Once the user touch has been received, the computing device identifies and interprets the portion of text that is to be selected, and subsequently presents the text audibly to the user.

24 Claims, 5 Drawing Sheets

(56) References Cited

U.S. PATENT DOCUMENTS

| | | | |
|---|---|---|---|
| 7,812,860 B2 * | 10/2010 | King et al. | 348/210.99 |
| 8,200,847 B2 * | 6/2012 | LeBeau et al. | 709/249 |
| 8,239,201 B2 * | 8/2012 | Conkie et al. | 704/260 |
| 8,300,776 B2 * | 10/2012 | Davies et al. | 379/88.11 |
| 8,451,238 B2 * | 5/2013 | Kim et al. | 345/173 |
| 8,471,824 B2 * | 6/2013 | Kim et al. | 345/173 |
| 8,489,400 B2 * | 7/2013 | Conkie et al. | 704/260 |
| 8,624,851 B2 * | 1/2014 | Kim et al. | 345/173 |
| 2003/0163321 A1 | 8/2003 | Mault | |
| 2004/0155869 A1 * | 8/2004 | Robinson et al. | 345/168 |
| 2005/0038657 A1 * | 2/2005 | Roth et al. | 704/260 |
| 2005/0137872 A1 * | 6/2005 | Brady | 704/269 |
| 2006/0098899 A1 | 5/2006 | King et al. | |
| 2007/0100635 A1 * | 5/2007 | Mahajan et al. | 704/276 |
| 2007/0192692 A1 | 8/2007 | Chen | |
| 2008/0233980 A1 | 9/2008 | Englund et al. | |
| 2008/0294442 A1 * | 11/2008 | Makela | 704/260 |
| 2009/0083035 A1 * | 3/2009 | Huang et al. | 704/260 |
| 2009/0099850 A1 | 4/2009 | Do et al. | |
| 2010/0070281 A1 * | 3/2010 | Conkie et al. | 704/260 |
| 2011/0050592 A1 * | 3/2011 | Kim et al. | 345/173 |
| 2011/0050593 A1 | 3/2011 | Kim et al. | |
| 2011/0106534 A1 * | 5/2011 | LeBeau et al. | 704/235 |
| 2011/0167350 A1 | 7/2011 | Hoellwarth | |
| 2012/0019446 A1 | 1/2012 | Wu et al. | |
| 2012/0020465 A1 | 1/2012 | Davies et al. | |
| 2012/0284339 A1 * | 11/2012 | Rodriguez | 709/204 |

* cited by examiner

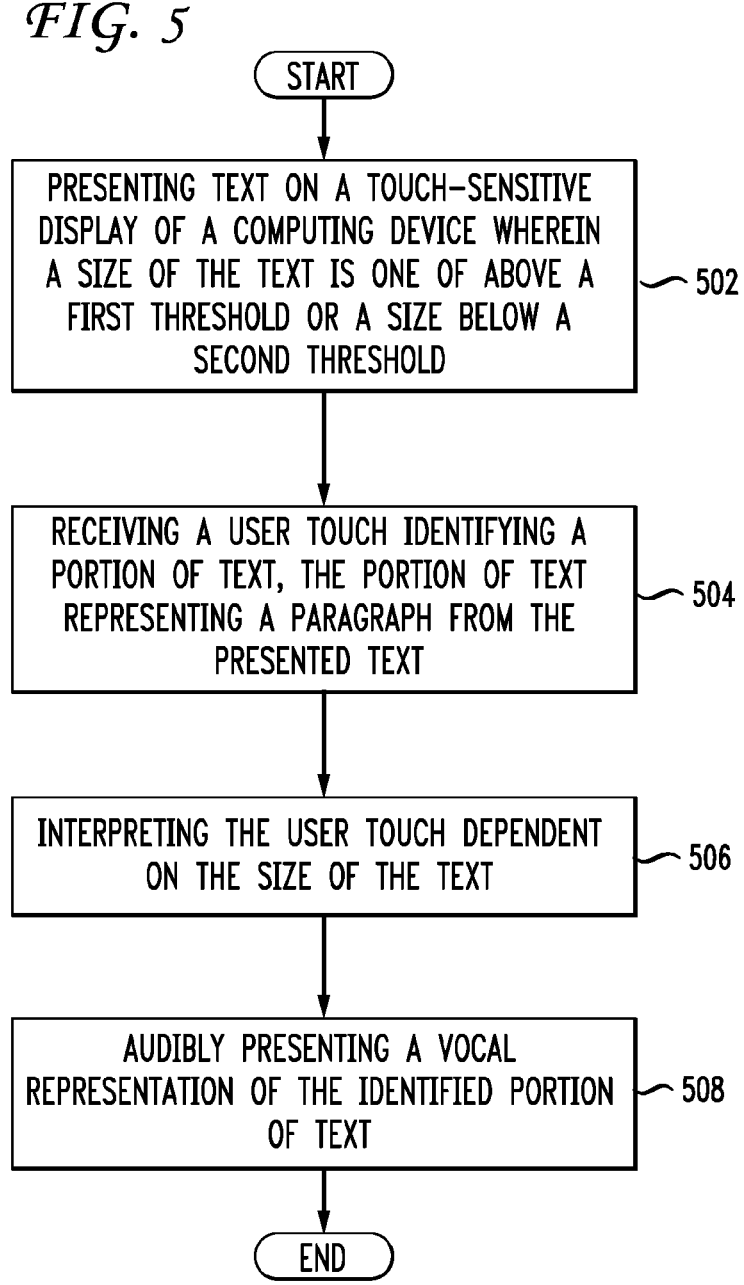

SYSTEM AND METHOD FOR AUDIBLY PRESENTING SELECTED TEXT

PRIORITY

The present application is a continuation of U.S. patent application Ser. No. 13/567,550, filed Aug. 6, 2012, which is a continuation of U.S. patent application Ser. No. 12/257,994, filed Oct. 24, 2008, now U.S. Pat. No. 8,239,201, issued on Aug. 7, 2012, which claims the benefit of U.S. Provisional Application No. 61/096,787, filed Sep. 13, 2008, the content of which is incorporated herein by reference in its entirety.

BACKGROUND OF THE INVENTION

1. Field of the Invention

The present invention relates to synthesizing speech and more specifically to synthesizing speech selected from a computing device.

2. Introduction

Currently, when a person wishes to have a portion of text read out loud that person has a limited number of ways to select the desired text. Those ways include conventional selecting of text by using mouse or other peripheral device. In some cases the user may have a voice activated method of selecting the desired text. Accordingly, what is needed in the art is an improved way selecting the text that is to be audibly presented.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are methods for selecting speech from a computing device via touch. Presently, there are many computing devices, including laptops and mobile phones that are incorporating the ability to sense touch and thus complete a command. The present disclosure deals with one method of using touch to complete a command, namely to select text via touch and then convert this touch selected text into a vocal representation of that text. Thus, the present disclosure will improve the functionality of touch based computing devices.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 5 illustrates an exemplary method claim.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
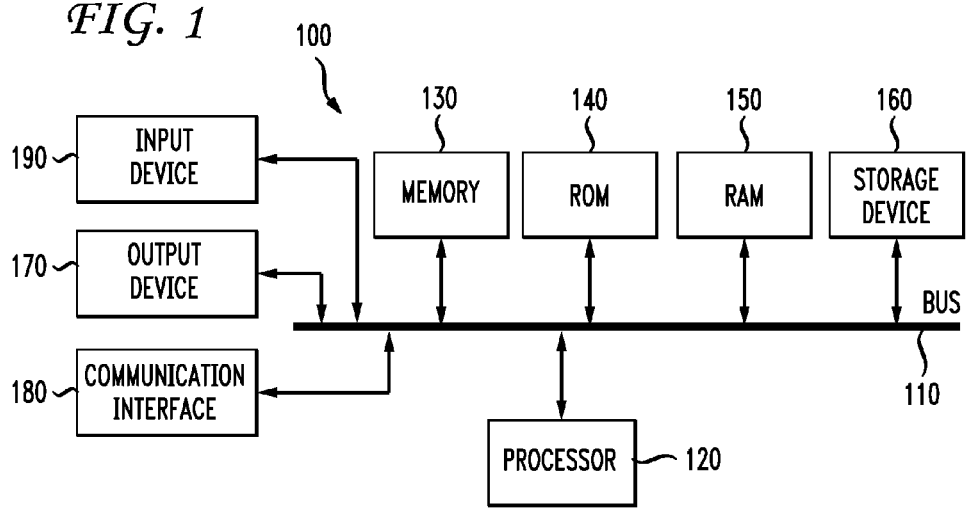
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
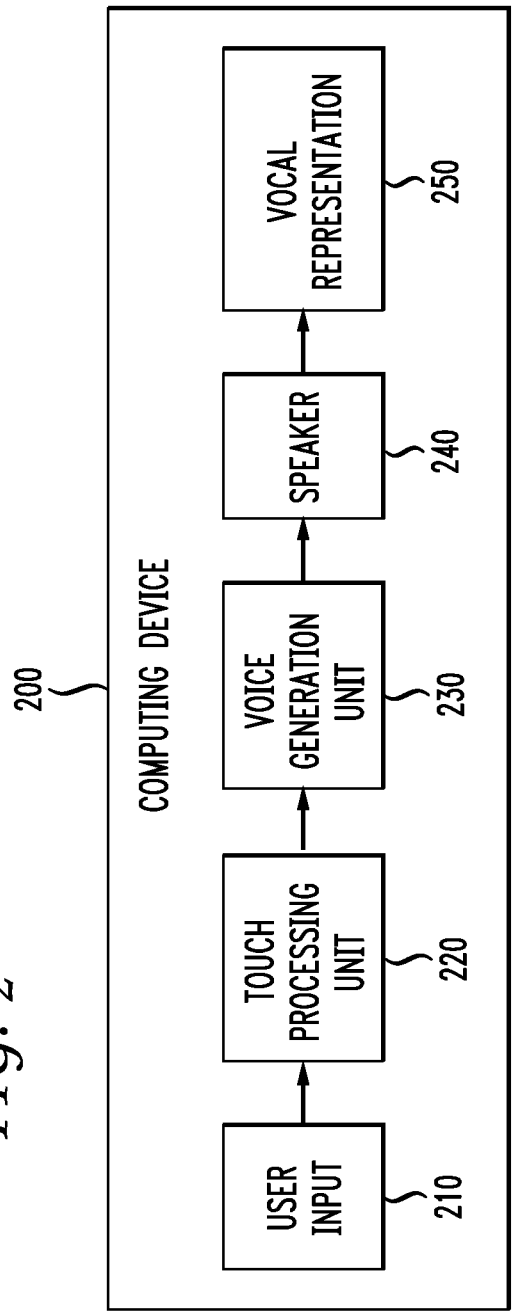
FIG. 2 illustrates a general embodiment of a computing device conforming to the present disclosure.

Having disclosed some fundamental system elements, the disclosure turns to other embodiments. These embodiments are discussed in terms of a system configured to practice the method. FIG. 2 illustrates a general block diagram that practices the basic method. Initially, the system receives user input 210 into computing device 200 via the touch processing unit 220. The touch processing unit 220 selects appropriate text based on the user input as a registered touch. The system converts the text to speech through the speech generation unit 230. The computing device can convert the text to speech, a remote system can convert the text to speech, the speech can be pre-converted and stored on the computing device, or the system can use other speech generation schemes. The computing device 200 audibly presents the vocal representation 250 of the selected text to the user via the speaker 240.

Figure 3:
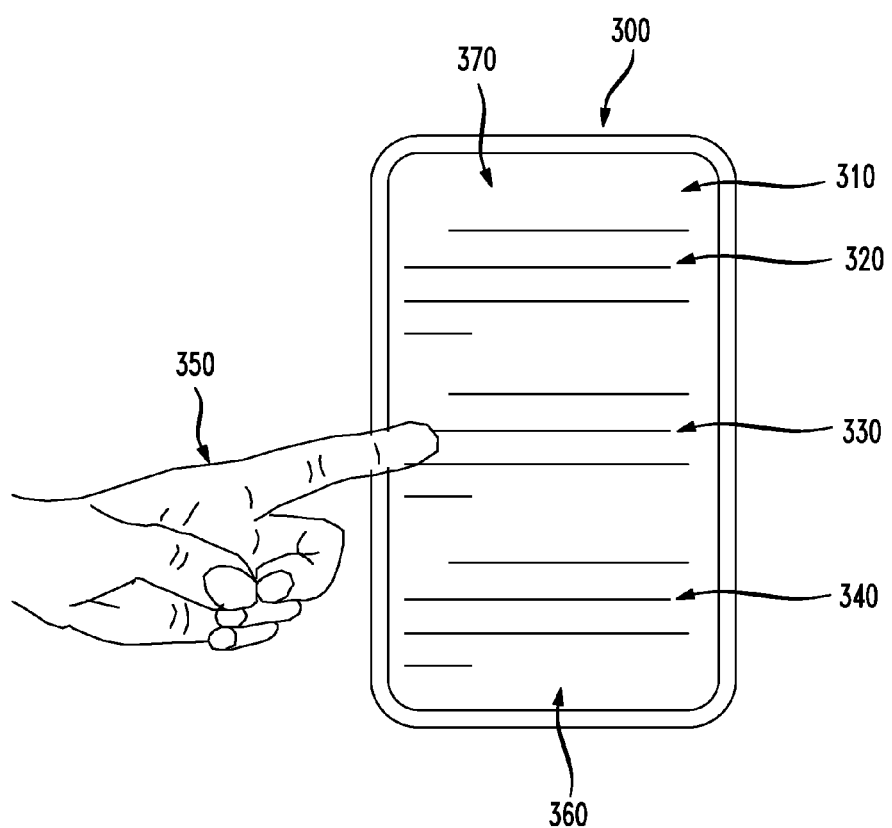
FIG. 3 illustrates a computing device with a display containing text and acting in conformity with this disclosure.

FIG. 3 shows a visual representation of an embodiment practicing the method. The computing device 300 has a touch screen 310. The touch screen displays text made up of paragraphs. A user's hand 350 points to paragraph 330. Upon touching paragraph 330 the system selects the text and can optionally highlight the selected text. The system processes selected text through a speech generation unit 230 and outputs a vocal representation 250 through a speaker 240, as shown in FIG. 2.

In one embodiment, the system accepts short pointed touches known as taps on the touch screen as an indication from the user to select text. In one aspect, the system extends this functionality to involve a selection based on the number of taps on the display 300. For example, consider a user's hand 350 tapping the display 300 two times in rapid succession. The system interprets the taps to mean that the user is attempting to select two of the displayed paragraphs. The paragraph need not be currently visible. However, for illustrative purpose, all paragraphs are visible in FIG. 3. If the user wishes to select paragraph 330 and paragraph 320 the user can tap once on paragraph 330 and then make the next successive tap between the initial tap on paragraph 330 and the top of the touch sensitive display 370. This includes tapping on paragraph 330 and 320 or any point between the initial touch and the top of the display. However, if the user wishes to select paragraph 330 and paragraph 340 then the second tap would be placed anywhere between the first tap and the bottom of the touch sensitive display 360. The system analyzes selected text by the touch processing unit and processed as described above.

In one aspect providing additional functionality, the system allows the user to trace the text to be vocally reproduced. The system processes the text contemporaneously as the user's finger touches a word. In this way a user can select the text of individual words, phrases, sentences, or whole paragraphs. However, the system selects and outputs text in real-time rather relying on the text for markers, such as paragraph breaks.

In another embodiment, the system uses the number of fingers used in a tap to automatically calculate the number of successive paragraphs that the user wishes to select. To further illustrate this idea, if a user wants to hear two paragraphs read out loud, she can simply tap two fingers simultaneously on the initial paragraph that the user wishes to select. The system, in response, audibly produces speech for the tapped paragraph and the immediately following paragraph. Those of skill in the art will be able to scale this example to its natural constraints based on the disclosure.

The principles disclosed herein can be adapted for use with a mobile device, smartphone, PDA, etc. Specifically, a mobile phone with a touch-screen can implement the method. Certain aspects of the invention can be modified to adapt to the smaller scale of the touch-screen display as compared to a full sized computer screen. In many cases, a mobile device has access to data transfer capabilities, typically in the form of an Internet connection. This is a typical feature of most modern general-purpose computing devices. Most home and business desktop and laptop computers have access to the Internet. Therefore Internet access is not illustrated, but is feature always under consideration with each of the various embodiments. A mobile device can access a database that can perform the conversion of the selected text to an audible output.

Figure 4:
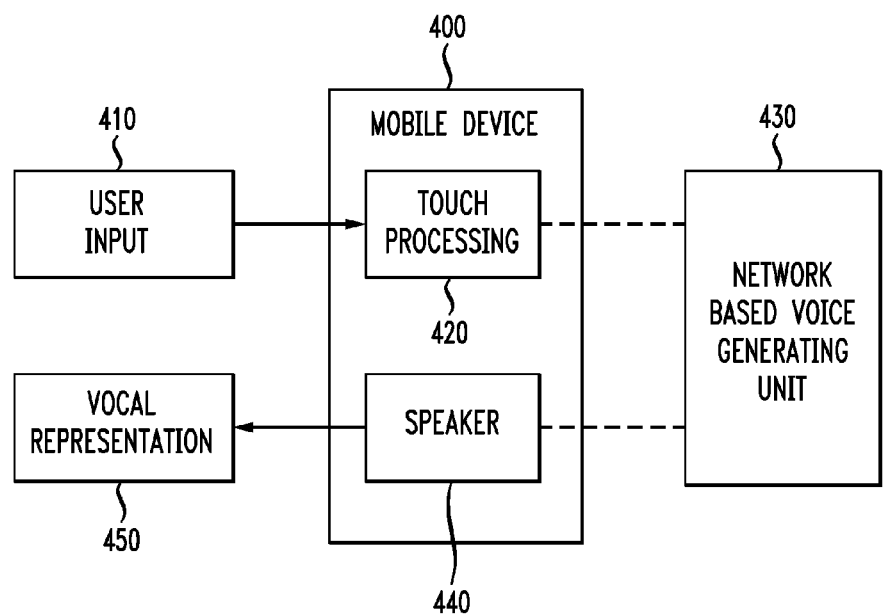
FIG. 4 illustrates a mobile device that can transfer data in conformance with the present disclosure.

FIG. 4 illustrates one embodiment of the implementation of the present disclosure. This embodiment contains a database removed from the mobile device. The mobile device transfers data to the database for processing. As shown, a touch processing unit 420 still processes the user input 410, but that can be wholly or partially external to the mobile device as well. However, the touch processing unit 420 transfers this data to a network-based voice generating unit 430 that converts the text to a vocal embodiment of that text. The system transfers the vocal representation 450 back to the mobile device 400 for output to the user through the speaker 440. This is one of many ways that this particular embodiment can be implemented.

In one aspect, the system varies device commands depending on the visibility of the text. The system can take into account the size of the text and interpret the command accordingly. One way to accomplish this task is setting thresholds for text size so that the program interprets the actions of the user in an appropriate way. One case where this is appropriate is where the text is too small to read comfortably. The user can zoom in prior to choosing whether to have the text read aloud. Size designations can take the form of actual text size in inches or meters for instance, or in designation of between text size 8 and 14, which are common in word processing programs. If two thresholds are set, one larger than the other, and the text is between these two thresholds, the program interprets user input as a request to audibly present the vocal representation, whereas outside this range, the computing device interprets the same command in a different way. This command, for instance to zoom in or zoom out, can involve the same touch interactions with the computing device that would represent producing the text audibly if the command is received within the thresholds. In this way the device can predict which actions the user wishes.

A further aspect of this disclosure is the ability to audibly represent the text in a number of different ways. A non-limiting list of ways to audibly represent text includes at least all the following examples when implementing this disclosure. One of the primary ways to implement this disclosure is to use a Text-To-Speech (TTS) program. Another method for implementing this disclosure is to have a pre-recorded voice that a program can play when a word in the text is recognized. This can be helpful if a bank of recorded words is already available via a network or as a program on a computer. The program, in this latter example, can stitch words and phrases together to produce the selected text. Further, if it is well-known text or text that is likely to be read aloud numerous times, whole paragraphs can be pre-produced from the text and thus produced aloud in its entirety. Finally, the program can use individual phonemes to create the selected words, phrases, or paragraphs.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to a portable audio device or a mobile book reader that can produce spoken words from the text, this can be helpful teaching kids to read, for example or help a user learn a foreign language. Those skilled in the art will readily recognize various modifications and changes that may be made to the present invention without following the example embodiments and applications illustrated and described herein, and without departing from the true spirit and scope of the present invention.

We claim:

1. A method comprising:
   displaying, via a processor, text via a touch-sensitive display;
   receiving, from the touch-sensitive display, user touch identifying a portion of the text;
   determining whether a size of a character of the portion displayed is between an upper threshold and a lower threshold; and
   responsive to the determination, audibly presenting the portion of the text.

2. The method of claim 1, wherein receiving the user touch further comprises receiving non-contiguous separate touches on the touch-sensitive display, wherein the non-contiguous separate touches indicate a number of paragraphs of the text to be audibly presented as the portion of the text.

3. The method of claim 1, wherein the user touch comprises data associated with a first tap at a first location and a second tap at a second location, and the portion of the text is identified as text displayed between the first location and the second location.

4. The method of claim 1, wherein audibly presenting the portion of the text occurs via a speaker associated with the touch-sensitive display.

5. The method of claim 1, wherein the touch-sensitive display is part of a mobile phone.

6. The method of claim 1, wherein audibly presenting the portion of the text comprises communicating pre-recorded phonemes combined together.

7. The method of claim 1, wherein the user touch identifies an area of the touch-sensitive display.

8. A system comprising:
   a processor; and
   a computer-readable storage medium having instructions stored which, when executed by the processor, result in the processor performing operations comprising:
   displaying text via a touch-sensitive display;
   receiving, from the touch-sensitive display, user touch identifying a portion of the text;
   determining whether a size of a character of the portion displayed is between an upper threshold and a lower threshold; and
   responsive to the determination, audibly presenting the portion of the text.

9. The system of claim 8, wherein receiving the user touch further comprises receiving non-contiguous separate touches on the touch-sensitive display, wherein the non-contiguous separate touches indicate a number of paragraphs of the text to be audibly presented as the portion of the text.

10. The system of claim 8, wherein the user touch comprises data associated with a first tap at a first location and a second tap at a second location, and the portion of the text is identified as text displayed between the first location and the second location.

11. The system of claim 8, wherein audibly presenting the portion of the text occurs via a speaker associated with the touch-sensitive display.

12. The system of claim 8, wherein the touch-sensitive display is part of a mobile phone.

13. The system of claim 8, wherein audibly presenting the portion of the text comprises communicating pre-recorded phonemes combined together.

14. The system of claim 8, wherein the user touch further comprises an area of the touch-sensitive display indicated by user touch.

15. A computer-readable storage device having instructions stored which, when executed by a computing device, result in the computing device performing operations comprising:
   displaying text via a touch-sensitive display;
   receiving, from the touch-sensitive display, user touch identifying a portion of the text;
   determining whether a size of a character of the portion displayed is between an upper threshold and a lower threshold; and
   responsive to the determination, audibly presenting the portion of the text.

16. The computer-readable storage device of claim 15, wherein receiving the user touch further comprises receiving non-contiguous separate touches on the touch-sensitive display, wherein the non-contiguous separate touches indicate a number of paragraphs of the text to be audibly presented as the portion of the text.

17. The computer-readable storage device of claim 15, wherein the user touch comprises data associated with a first tap at a first location and a second tap at a second location, and the portion of the text is identified as text displayed between the first location and the second location.

18. The computer-readable storage device of claim 15, wherein audibly presenting the portion of the text comprises communicating pre-recorded phonemes combined together.

19. The computer-readable storage device of claim 15, wherein the touch-sensitive display is part of a mobile phone.

20. The computer-readable storage device of claim 15, wherein audibly presenting comprises communicating pre-recorded phonemes combined together.

21. The method of claim 1, wherein determining whether a size of a character of the portion displayed is between an upper threshold and a lower threshold comprises determining whether a font point size of the character is between an upper threshold font point size and a lower threshold font point size.

22. The method of claim 1, wherein determining whether a size of a character of the portion displayed is between an upper threshold and a lower threshold comprises determining whether an actual size of the character in inches or meters is between an upper threshold character size and a lower threshold character size.

23. The method of claim 1, further comprising:
   identifying a set of paragraphs to audibly present based on a number of fingers used in the user touch, the set of paragraphs including the portion; and
   audibly presenting the set of paragraphs.

24. The method of claim 1, further comprising:
   receiving, from the touch-sensitive display, a plurality of user touches that includes the user touch;
   identifying a set of paragraphs to audibly present based on a count of the user touches, the set of paragraphs including the portion; and
   audibly presenting the set of paragraphs.

\* \* \* \* \*